United States Patent [19]
Yasui

[11] Patent Number: 5,686,810
[45] Date of Patent: Nov. 11, 1997

[54] CHARGING DEVICE

[75] Inventor: Tsuneo Yasui, Nagoya, Japan

[73] Assignee: Brother Kogyo Kabushiki Kaisha, Aichi-Ken, Japan

[21] Appl. No.: 704,848

[22] Filed: Aug. 28, 1996

(Under 37 CFR 1.47)

[30] Foreign Application Priority Data

Sep. 1, 1995 [JP] Japan .................. 7-224963

[51] Int. Cl.$^6$ .................................. H01M 10/46
[52] U.S. Cl. .................................. 320/2; 429/97
[58] Field of Search .................. 320/2, 5; D13/103, D13/107; 429/97, 98

[56] References Cited

U.S. PATENT DOCUMENTS

| | | | |
|---|---|---|---|
| 5,159,256 | 10/1992 | Mattinger et al. | 320/2 |
| 5,530,334 | 6/1996 | Ramspeck et al. | 320/2 |
| 5,594,314 | 1/1997 | Hagiuda et al. | 320/2 |

Primary Examiner—Edward Tso
Attorney, Agent, or Firm—Kane, Dalsimer, Sullivan, Kurucz, Levy, Eisele and Richard, LLP

[57] ABSTRACT

In the charging device, when the secondary battery is charged, charging electrodes are electrically connected to the battery electrodes. When charging of the battery is completed, charging operation of the charging device is completed, and the charging electrodes are moved away from the battery electrodes so that the charging electrodes are disconnected from the battery electrodes.

16 Claims, 9 Drawing Sheets

CHARGING DEVICE

BACKGROUND OF THE INVENTION

The present invention relates to a charging device for charging a secondary battery such as a Nickel-Cadmium battery.

Figure 1:
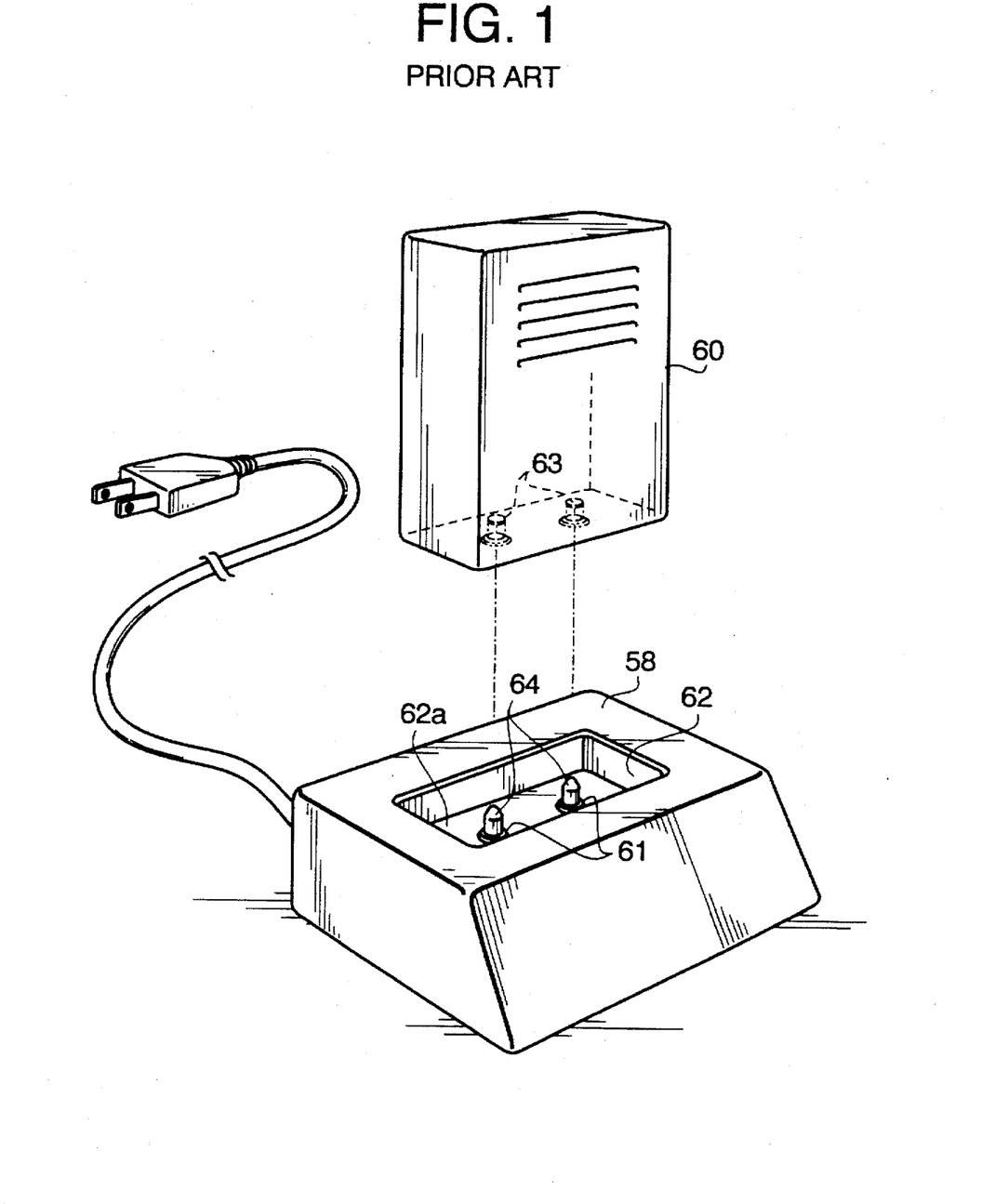
FIG. 1 is a perspective view showing a conventional secondary battery and a conventional charging device therefor.

Conventionally, there is known a charging device for charging a chargeable battery such as a Nickel-Cadmium battery and the like. An example of such a charging device is shown in FIG. 1. FIG. 1 is a perspective view of a secondary battery (i.e., a chargeable battery) 60 and a conventional battery charging device 58 for charging the secondary battery 60. The charging device 58 has a battery accommodating chamber 62 on the upper portion of the body thereof. The battery 60 is fitted in the accommodation chamber 62 and mounted on the battery charging device 58. On the bottom surface of the battery 60, as shown in FIG. 1, a plurality of electrodes 63 are provided. Corresponding to the electrodes 63 of the battery, a plurality of charging electrodes 64 are provided on the bottom surface 62a of the accommodating chamber 62. The charging electrodes 64 are projected through openings 61 formed on the bottom surface 62a, and biased upwardly so that the charging electrodes 64 keep contacting the battery electrodes 63 when the battery 60 is mounted on the charging device 58.

Generally, when charging is completed, the temperature of the secondary battery 60 increases extremely. In the charging device as described above, with use of a temperature detector such as a thermostat, the temperature of the battery 60 is detected, and if the temperature increases extremely, charging is stopped in order to avoid deterioration of the battery 60 due to an overcharging.

In the conventional battery charging device, however, even if the charging operation is stopped when the charging of the battery is completed, the battery electrodes and the charging electrodes are maintained to contact. If the battery is not removed from the charging device, discharging may occur through the battery electrodes and the charging electrodes. Further, corrosion of the battery electrodes and the charging electrodes may occur since they keep contacting after the battery has been charged.

SUMMARY OF THE INVENTION

It is therefore an object of the present invention to provide an improved charging device which does not deteriorate a battery even if the battery stays mounted on the charging device.

For the above object, according to an aspect of the invention, there is provided a charging device a charging device for charging a secondary battery, the charging device having a plurality of charging electrodes for supplying electrical current, the secondary battery having a plurality of battery electrodes through which the electrical current is supplied from the plurality of charging electrodes, the device comprising:

- a charging completion detector for detecting whether charging of the secondary battery is completed;
- a mechanism for insulating connection between the plurality of charging electrodes with the plurality of battery electrodes when the charging completion detector detects that the charging of the secondary battery is completed.

Optionally, the mechanism is capable of disconnecting the plurality of charging electrodes with the plurality of battery electrodes by relatively moving the plurality of charging electrodes away from the plurality of battery electrodes.

Further, the charging electrodes can be positioned at a first position where the charging electrodes contact the plurality of battery electrodes respectively, and a second position where the charging electrodes do not contact the plurality of battery electrodes. The mechanism positions the charging electrodes at the first position or the second position in accordance with the detection result of the charging completion detector.

Optionally, the mechanism has an arm member on which the plurality of charging electrodes are mounted, and a driving mechanism for driving the arm member to move the charging electrodes.

Further, the arm member may be rotatably supported about an axis, and the arm member has a gear portion which is formed about the axis. Furthermore, the mechanism has a gear member which is connected to a motor. The gear member is engaged with the gear portion of the arm member. The arm member is moved between the first and second positions as the motor rotates the gear member.

The mechanism may have a biasing member for biasing the plurality of charging electrodes in a direction where the plurality of charging electrodes contact the plurality of battery electrodes, respectively, and an actuator for moving the plurality of charging electrodes away from the plurality of battery electrodes against a biasing force of the biasing member.

Further optionally, the actuator may be composed of a solenoid having a coil and a movable core, the plurality of charging electrodes being moved by the movable core when the solenoid is energized.

Still optionally, the detector may include a voltage detector for detecting a voltage of the secondary battery. The detector nay determine that the charging of the secondary battery is completed when the voltage of the secondary battery becomes within a predetermined voltage range.

According to another aspect of the invention, there is provided a charging device for charging a secondary battery, the charging device having a plurality of charging electrodes for supplying electrical current, the secondary battery having a plurality of battery electrodes through which the electrical current is supplied from the plurality of charging electrodes, the device comprising:

- a first mechanism for allowing the plurality of charging electrodes to contact the plurality of battery electrodes, the first mechanism being neutrally effected;
- a second mechanism for insulating the plurality of charging electrodes from the plurality of battery electrodes; and
- a controller for activating the second mechanism when charging of the second battery is not being executed.

Optionally, the controller activates the second mechanism only when the charging is once started and then terminated.

Further, the charging device may include a detector for detecting whether charging of the secondary battery is completed while the charging is executed. The controller activates the second mechanism if the detector detects that the charging of the secondary battery is completed.

Furthermore, the charging device is provided with a current source, controlled by the controller, for supplying electrical current to the plurality of charging electrodes. The controller controls the current source to supply the electrical current when the charging is executed, and to stop supplying the electrical current when the detector detects that the charging is completed.

Further optionally, the charging device may have a battery receiving portion on which the secondary battery is mounted, the plurality of battery electrodes being provided on a surface facing the battery receiving portion, the plurality of charging electrodes being arranged at the battery receiving portion on a battery receiving surface facing the secondary battery.

Further, a plurality of openings are formed on the battery receiving surface, and the plurality of charging electrodes protrude provided through the plurality of openings, respectively. The first mechanism comprises an electrodes supporting member on which the plurality of charging electrodes are planted, the electrodes supporting member being movable between at least first position where the plurality of charging electrodes are press-contacted with the plurality of battery electrodes, respectively, and a second position where the plurality of charging electrodes are retracted from the battery receiving surface and do not contact the plurality of battery electrodes.

Furthermore, the first mechanism further comprises a biasing member for biasing the electrodes supporting member to be positioned at the first position.

Still further, the second mechanism further comprises an actuator for moving the electrodes supporting member to be positioned at the second position against a biasing force of the biasing member.

DESCRIPTION OF THE EMBODIMENT

Figure 2:
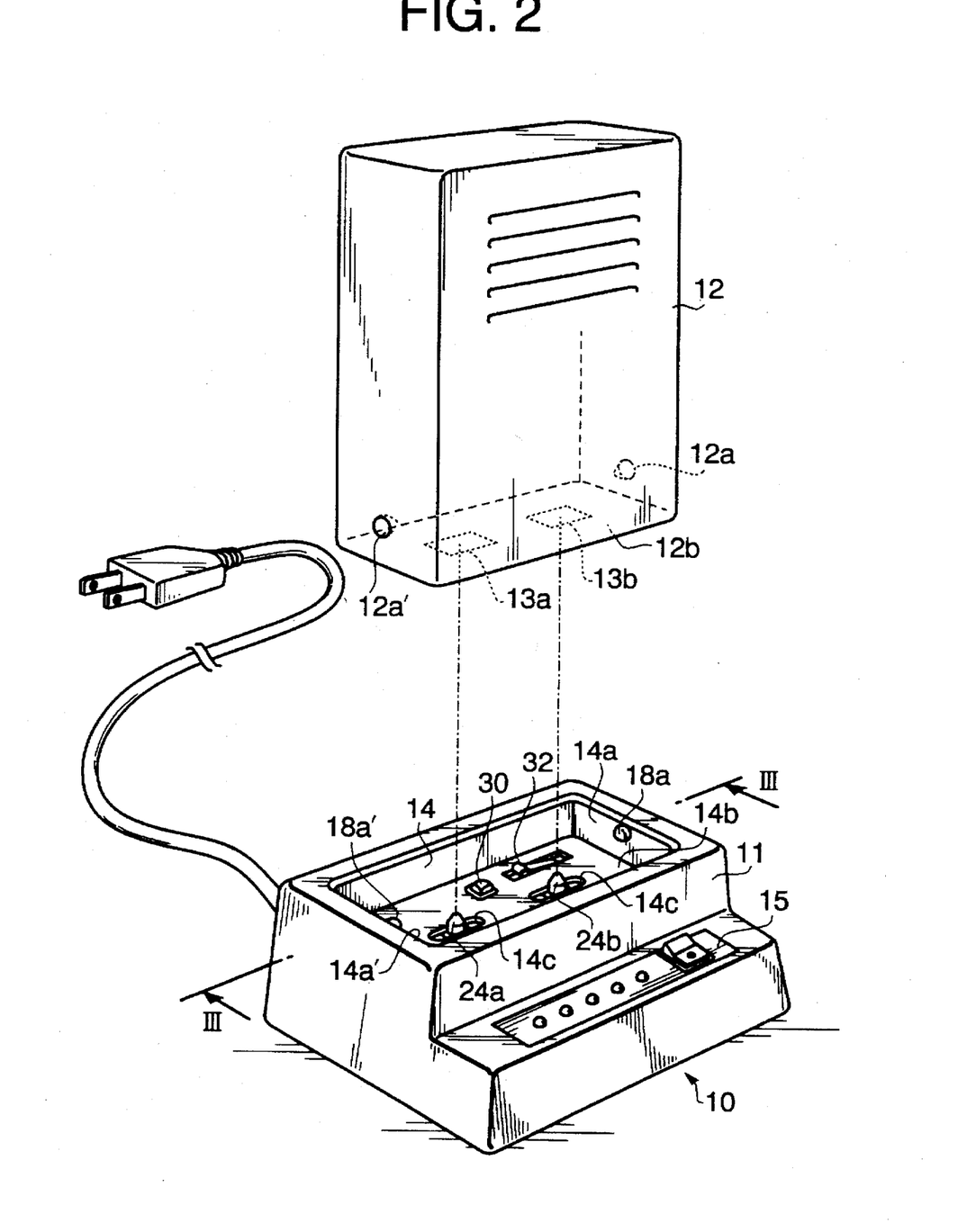
FIG. 2 a perspective view showing a secondary battery and a charging device embodying the present invention.
Figure 3:
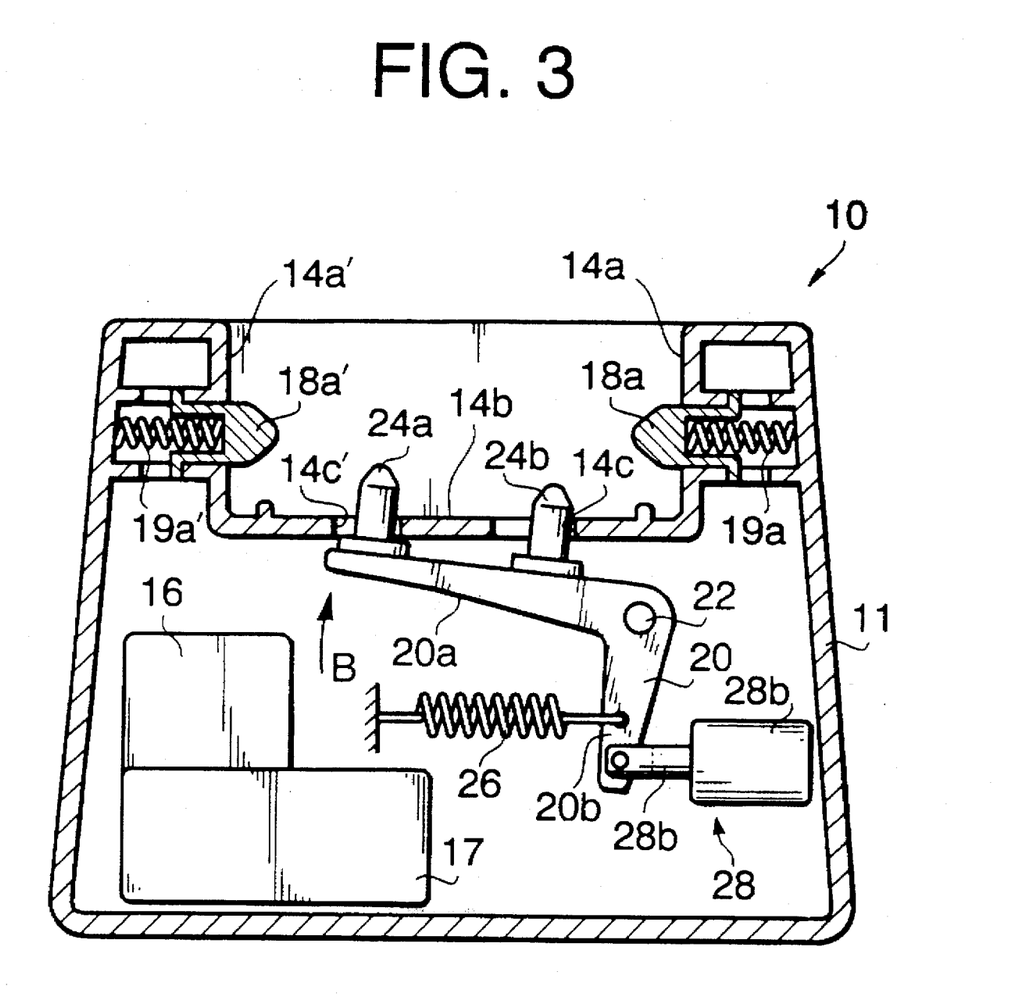
FIG. 3 is a III—III cross sectional view of the charging device shown in FIG. 2.

FIG. 2 is a perspective view of a charging device 10 embodying the invention, and a chargeable battery 12. FIG. 3 is a cross sectional view of the charging device 12 seen from a line III—III of FIG. 2.

As shown in FIG. 2, the charging device 10 has a casing 11. A front surface of the casing 11 is formed to be a stepped surface where a display panel 15 for indicating charging condition of the battery is provided. Inside the casing 11, as shown in FIG. 2, a current source unit 16 for supplying electrical current to the battery 12, and a control unit 17 for controlling the entire operation of the charging device 10 are provided.

On the top portion of the charging device 10, a stepped receptacle 14 is formed for receiving and holding the bottom portion of the battery 12 when the battery 12 is mounted on the charging device 10 to be charged. On side surfaces 14a and 14a', which face to each other, lock pins 18a and 18a' are projected. The lock pins 18a and 18a' are respectively biased in the direction where they project from the side surfaces 14a and 14a' by compression coil springs 19a and 19a' as shown in FIG. 3. On the side surfaces of the battery 12, corresponding to the lock pins 18a and 18a', engaging stepped portions 12a and 12a' are formed as shown in FIG. 2. When the battery 12 is mounted on the charging device 10, the lock pins 18a and 18a' are once moved by the side surfaces of the battery 12 in the direction opposite to the biased direction, respectively, and then the lock pins 18a and 18a' engage with the stepped portions 12a and 12a' when the battery 12 is completely mounted on the charging device 10, i.e., when the battery 12 is held at the receptacle 14.

On the bottom surface 12b of the battery 12, two battery electrodes 13a and 13b are provided. Corresponding to the battery electrodes 13a and 13b, from the bottom surface 14b of the receptacle 14, charging electrodes 24a and 24b are projected through openings 14c and 14c' which are formed on the bottom surface 14b.

Further, on the bottom surface 14b, a temperature sensor 30 for detecting the temperature of the battery 12 is provided. Next to the temperature sensor 30, a detection switch 32 for detecting whether the battery 12 is held in the receptacle 14 is provided.

Inside the casing 11, as shown in FIG. 3, an arm member 20 is provided. The arm member 20 has substantially an L-shaped cross section, and pivoted by a shaft 22 at the bent portion of the L-shape such that the arm member 20 is rockable about the shaft 22. The charging electrodes 24a and 24b are mounted on a hand 20a as shown if FIG. 3. On the other hand 20b of the arm member 20, an end of a tension spring 26 is hooked, the other end of the tension spring 26 is fixed on a chassis or the like of the charging device. Due to the biasing force of the tension spring 26, the arm member 20 is biased in the direction indicated by arrow B. Accordingly, the charging electrodes 24a and 24b are biased in the direction where they are protruded from the bottom surface 14b of the receptacle 14 by the biasing force of the spring 26. Further, the hand 20b of the arm member 20 is connected with an actuator 28. The actuator 28 is capable of moving the arm member 20 in a counterclockwise direction against the biasing force of the tension spring 26. Therefore, when the actuator 28 is not driven, the arm member 20 is located at the position as shown in FIG. 3, and when the actuator 28 is driven, the arm member 20 rotates counterclockwise such that the charging electrodes 24a and 24b are retracted from the bottom surface 14b of the battery receptacle 14. In the embodiment, as the actuator 28, a solenoid is used. As shown in FIG. 3, the solenoid 28 is provided with a coil 28b and a movable iron core 28a which is pulled towards the coil 28b when the coil 28b is energized. An end of the iron core 28a is connected to a tip of the hand 20b of the arm member 20. Therefore, when the coil 28b is energized, the iron core 28a is pulled towards the coil 28b (in rightward direction in FIG. 3), and therefore the arm member 20 rotates counterclockwisely about the shaft 22.

Figure 4:
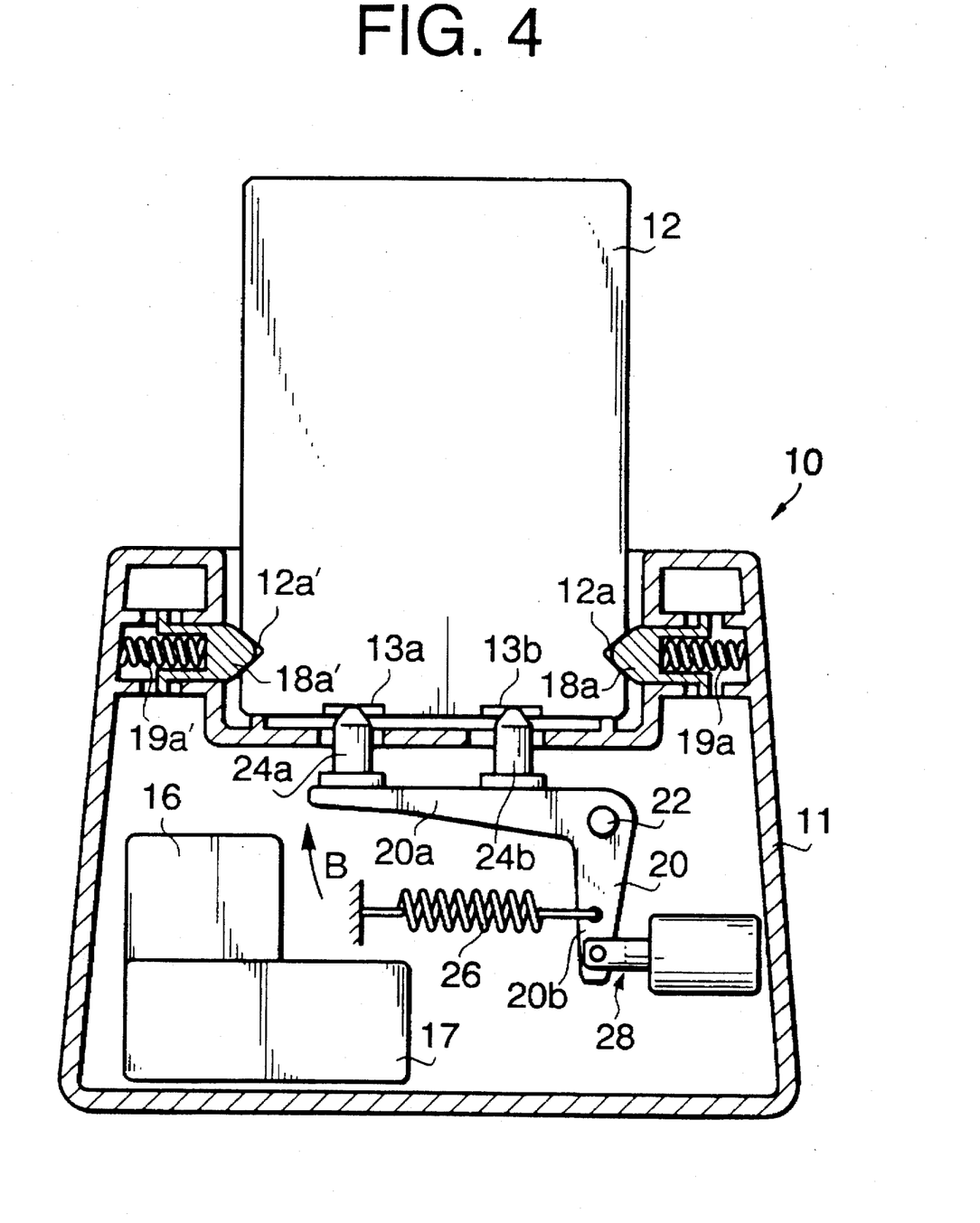
FIG. 4 is a cross sectional view of the charging device on which the secondary battery is mounted, when charging electrodes contact the battery electrodes.

FIG. 4 is a cross sectional view similar to FIG. 3 except that the battery 12 is mounted on the charging device 10. As described before, when the battery 12 is mounted, the pins 18a and 18a' engage with the stepped portions 12a and 12a' of the battery 12 to stably support the battery in the battery receptacle 14. The charging electrodes 24a and 24b are pushed by the electrodes 13a and 13b provided on the bottom surface of the battery 12 as shown in FIG. 3. In this condition, the arm member 20 is rotated counterclockwisely with respect to the position shown in FIG. 3 against the biasing force of the spring 26. Since the actuator 28 is not driven, the arm member 20 is still biased in the direction of arrow B, the charging electrodes 24a and 24b are press-contacted to the battery electrodes 13a and 13b, respectively. If the current source 16 starts supplying the electrical current under control of the control unit 17, the current is supplied to the battery through the charging electrodes 24a and 24b, and the battery electrodes 13a and 13b.

Figure 5:
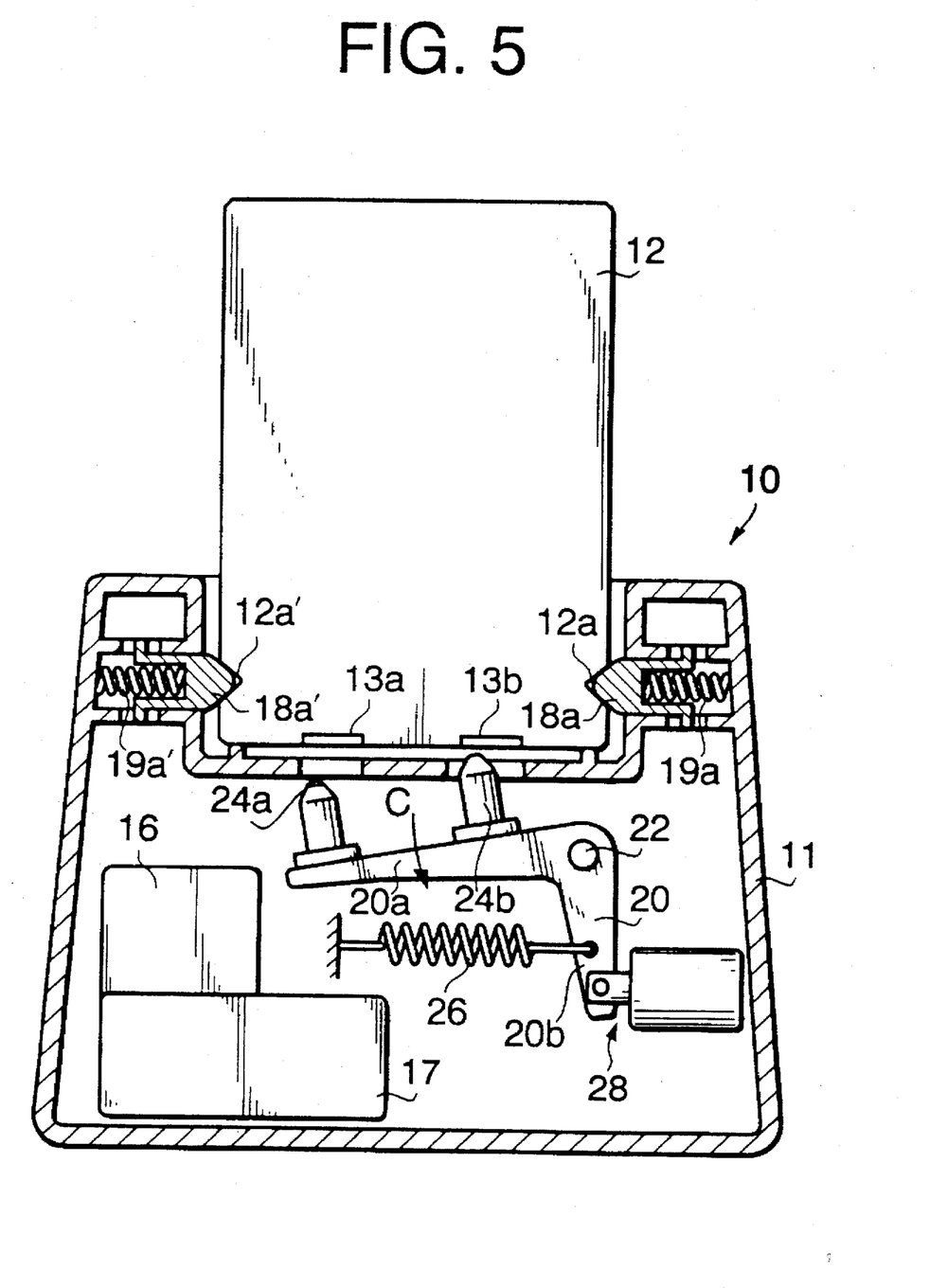
FIG. 5 is a cross sectional view of the charging device similar to FIG. 4 except that the charging electrodes are disconnected from the battery electrodes.

FIG. 5 is a cross sectional view of the battery 12 and the charging device 10 when the charging of the battery 12 was completed and the charging electrodes 24a and 24b has been retracted from the bottom surface 14b of the receptacle 14. As described before, when the charging of the battery is completed, the actuator 28 is driven. Then, the arm member 20 is rotated in the direction indicated by arrow C (counterclockwisely) against the biasing force of the spring 26. While the actuator 28 is being driven, the status as shown in FIG. 5 is maintained, and therefore the charging electrodes 24a and 24b are maintained not to contact the battery electrodes 13a and 13b. Since the charging electrodes 24a and 24b do not contact the battery electrodes 13a and 13b, above described problems, i.e., discharging and corrosion problems are resolved.

Figure 6:
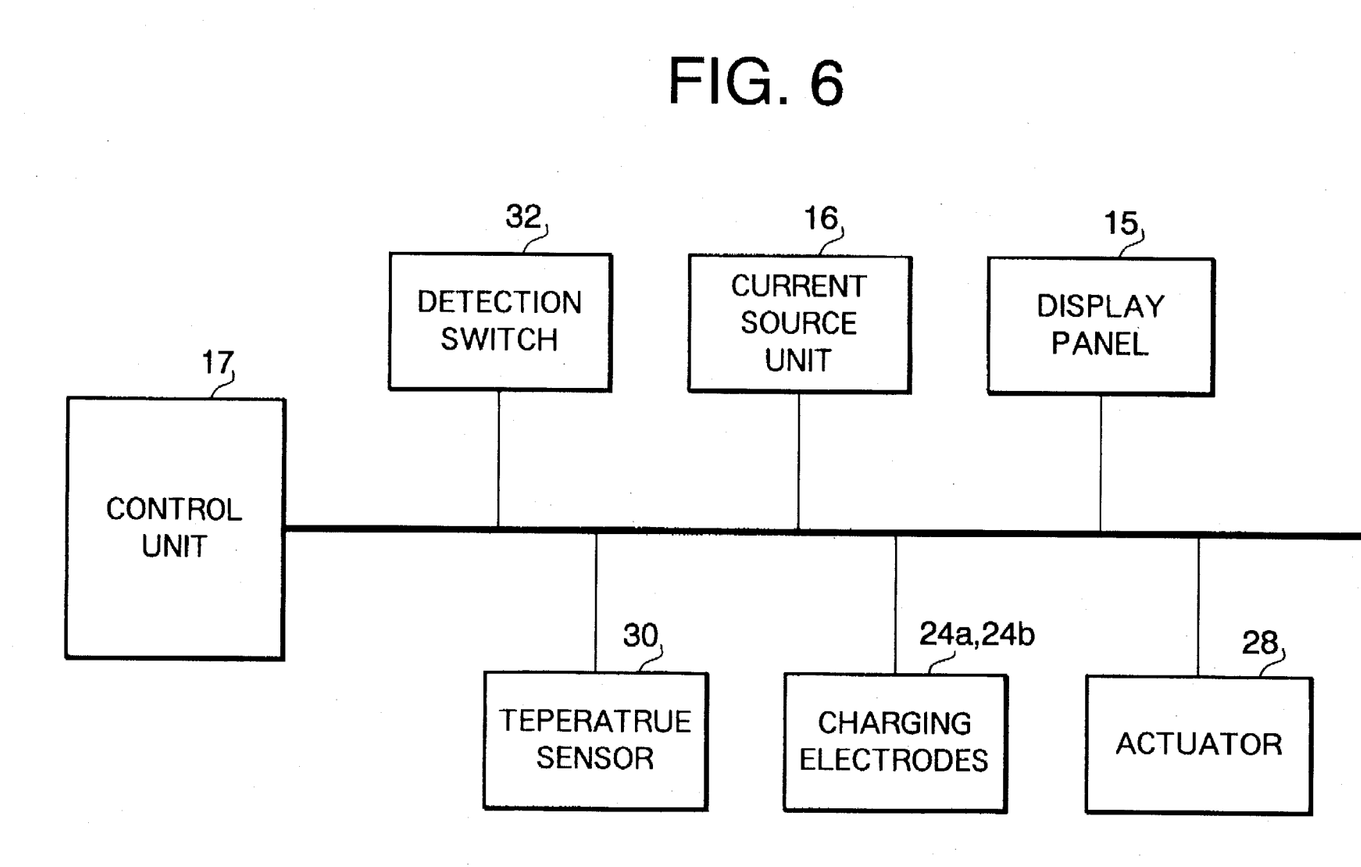
FIG. 6 is a block diagram showing a control system of the charging device.

FIG. 6 is a block diagram illustrating the controlling system of the charging device 10.

The display panel 15, the current source unit 16, the charging electrodes 24a and 24b, the actuator 28, the temperature sensor 30, and the detection switch 32 are connected to the control unit 17.

The current source 16 is a well-known switching current source, or a regulate current source, and supplies the electrical current when it receives a charge instruction signal from the control unit 17. The current source 16 has a voltage/current detection device for detecting the charged voltage of the battery 12 and charging current with use of a shunt register or the like.

The control unit 17 has a microprocessor provided with a timer, A/D (analog to digital) converter to be used for performing a controlling operation. The control unit 17 outputs the charge instruction signal in accordance with the charged voltage and charging current detected by the voltage/current detection device of the current source unit 16, the temperature of the battery 12 detected by the temperature sensor 30, and the information representing whether the battery 12 is mounted which is detected by the detection switch 32. Further, the control unit 17 controls the display panel 15 to display information related to the charged voltage, charging current and the temperature of the battery 12. In the embodiment, the display panel 15 has a plurality of LEDs (light emitting diodes), and the information is indicated by the combination of lit LEDs. For example, the LEDs are controlled to turn on respectively to indicate that the charging is being executed, and/or the charging is completed.

Figure 7:
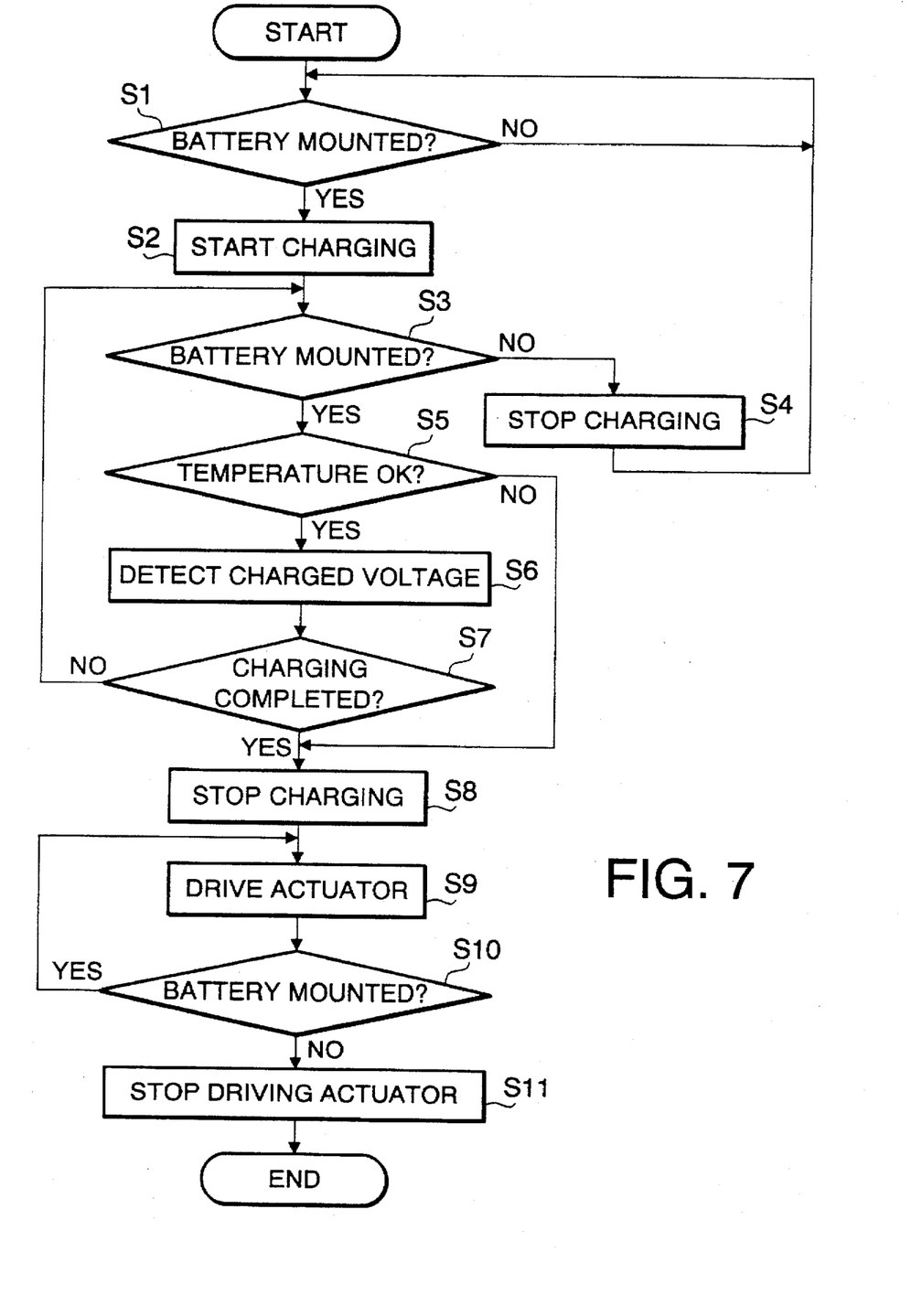
FIG. 7 is a flowchart illustrating an operation executed by a control unit of the charging device.

FIG. 7 is a flowchart illustrating the operation executed by the control unit 17.

The flowchart shown in FIG. 7 is executed when a power switch provided next to the display panel is turned ON. At S1, the control unit 17 determines whether the battery 12 is mounted on the charging device 10 based on whether the detection switch 32 is on or off. If the battery 12 is not mounted (S1:NO), the detection at S1 is repeated. If the control unit 17 determines that the battery 12 is mounted on the charging device 10 (S1:YES), the control unit 17 starts charging of the battery 12 by sending the charge start instruction signal to the current source unit 16 (S2). The current source unit 16 starts charging, i.e., starts supplying current to the battery 12 through the charging electrodes 24a, 24b, and the battery electrodes 13a and 13b. When charging starts at S2, the control unit 17 controls the LEDs provided on the display panel 15 to indicate the charging condition in accordance with the charging voltage, charging current and the temperature of the battery 12.

The control unit 17 determines whether the battery 12 is removed from the receptacle 14 during the charging operation based on the status of the detection switch 32 (S3). If the battery 12 is removed (S3:NO), the control unit 17 stops charging at S4, and control returns to S1 to wait that the battery 12 is mounted. If the battery 12 is held in the receptacle 14 (S3:YES), the control unit 17 determines whether the battery 12 is normally charged based on whether the temperature of the battery 12 detected by the temperature sensor 30 is within a predetermined temperature range (S5). If the control unit 17 determines that the temperature of the battery 12 is out of the predetermined temperature range (S5:NO), the charging should be terminated because an error condition occurs in the battery 12 and/or the charging device 10. In such a case, control goes to S8 to stop charging, followed by steps S9 through S11 which will be described. If the control unit 17 determines that the temperature of the battery 12 is within the predetermined temperature range (S5:YES), voltage of the battery 12 is detected with use of the shunt resistor (S6). After the charged voltage of the battery 12 is detected, whether the charging is completed is determined based on the charged voltage at S7. If the charging has not finished yet (S7:NO), control returns to S3 and charging is kept by repeating procedures in steps S3 through S7. If the control until 17 determines that charging is finished (S7:YES), the control unit 17 sends a charge stop instruction signal to the current source unit 16 to stop charging (S8). Then, at S9, the control unit 17 drives the actuator 28 so that the charging electrodes 24a an 24b are disconnected from the battery electrodes 13a and 13b. Note that in the embodiment, only while the actuator 28 is being driven, the electrodes 24a and 24b are disconnected from the battery electrodes 13a and 13b. At S10, the control unit 17 determines whether the battery 12 is removed from the receptacle 14 in accordance with the output signal of the detection switch 30. If the battery 12 is held in the receptacle 14 (S10:YES), in order to prevent contact between the charging electrodes 24a, 24b and the battery electrodes 13a and 13b, the control unit 17 keeps driving the actuator 28 by executing S9 and S10. Therefore, even if charging of the battery 12 is completed, when the battery 12 stays mounted on the charging device 10 (i.e., held in the receptacle 14), the actuator 28 is kept driven. If the battery 12 is removed from the receptacle 14 after the charging has completed (S10:NO), the control unit 17 stops driving the actuator 28 since even if the charging electrodes 24a and 24b return the position where they protrude from the bottom surface 14b of the receptacle 14, the charging electrodes 24a and 24b do not contact the battery electrodes 13a and 13b any more.

As described above, according to the charging device 10 described above, the charging electrodes do not contact the battery electrodes even if the battery stays mounted onto the charging device after charging has been completed. Therefore, discharging of the battery through the battery electrodes and charging electrodes are prevented. Further, corrosion of the electrodes due to the contact thereof can also be prevented.

In the embodiment, disconnection between the charging electrodes and the battery electrodes are achieved with use of an L-shaped arm member 20. Instead of using the L-shaped arm member, it is also possible to use a plate member provided with the charging electrodes thereon, and an elevation mechanism for moving the plate member upwardly/downwardly. In this case, a biasing member for biasing the plate member in an upward direction.

Alternatively, the charging electrodes may be fixed onto the bottom surface 14b of the receptacle 14, and the bottom surface 14b may be made movable in the upward/downward directions. In this case, an compression spring may be arranged below the plate member to bias the plate member upwardly, and an actuator is also arranged below the bottom surface 14b such that the bottom surface is moved downwardly by the actuator to disconnect the battery electrodes from the charging electrodes against the biasing force of the compression spring.

Further alternatively, instead of moving the charging electrodes, it is possible to move the battery electrodes by moving the battery 12. For this purpose, a compression spring may be provided between the bottom surface of the battery and the bottom surface 14b of the receptacle such that the compression spring biases the battery 12 to move upwardly. In such a construction, an actuator may be provided at lock pins 18a and 18a' for releasing the engagement between the lock pins 18a, 18a' and the engagement stepped portions 12a and 12b. When charging of the battery 12 is completed, the actuators may be driven to release the engagement of the lock pins 18a and 18a' with the engagement stepped portions 12a and 12b. Then, due to the biasing force of the compression spring, the battery 12 is lift and the battery electrodes are disconnected from the charging electrodes.

In the embodiment, the tension spring 26 is used for biasing the arm member 20. Instead of the spring 26, rubber or the like having a sufficient resilience can be used to bias the arm member 20.

Figure 8:
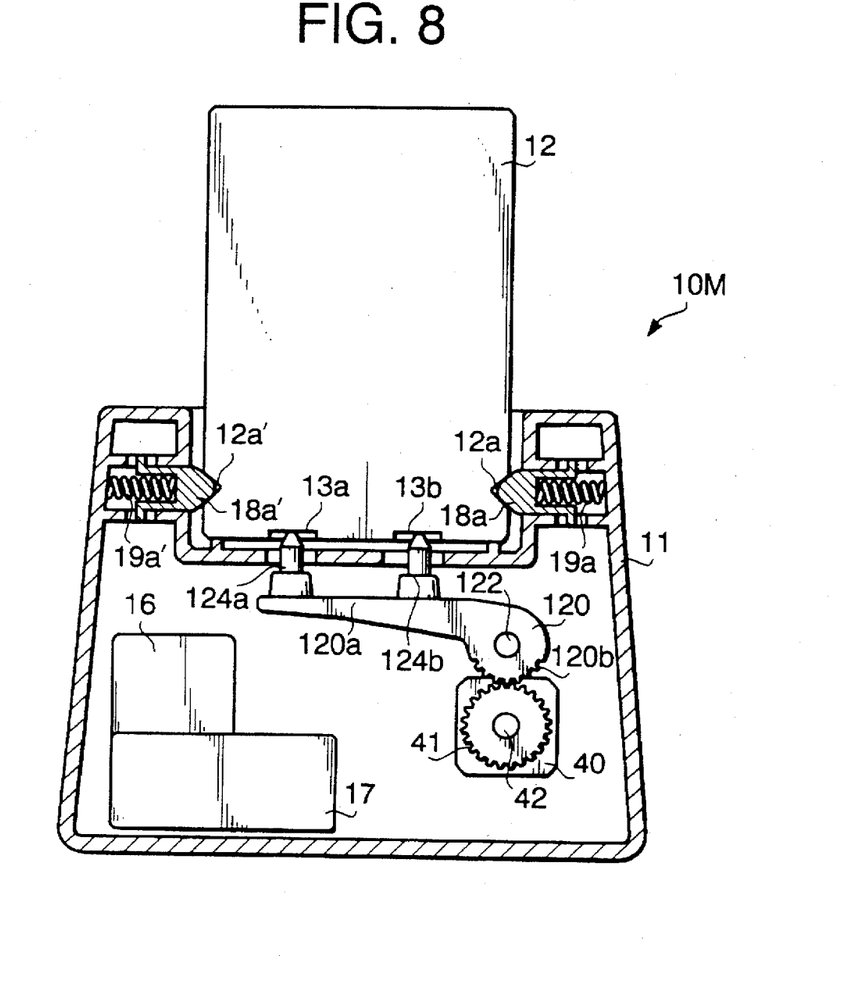
FIG. 8 is a cross sectional view of a second embodiment of the charging device with the secondary battery is mounted, when charging electrodes contact the battery electrodes.
Figure 9:
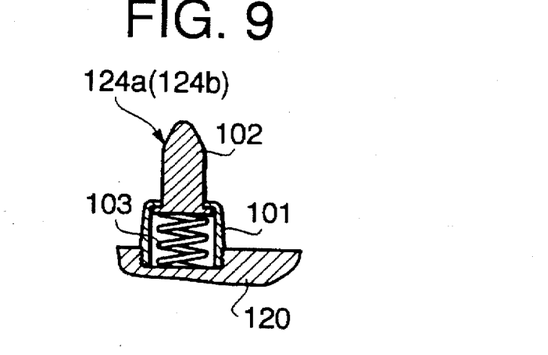
FIG. 9 is a cross sectional view of the charging electrode.

Further, in the embodiment, a solenoid is used as the actuator 28. However, the actuator 28 is not limited to the solenoid and any member which can rotate the arm member 20 can be used. For example, a gear mechanism utilizing a motor and gears can be used instead of the structure described above. If the gear mechanism is to be used instead of the actuator 28, the biasing member may be omitted since the position of the arm member may be completely controlled by the gear mechanism. FIGS. 8 through 9 show a second embodiment of a charging device 10M which employs the gear mechanism as described above.

Figure 10:
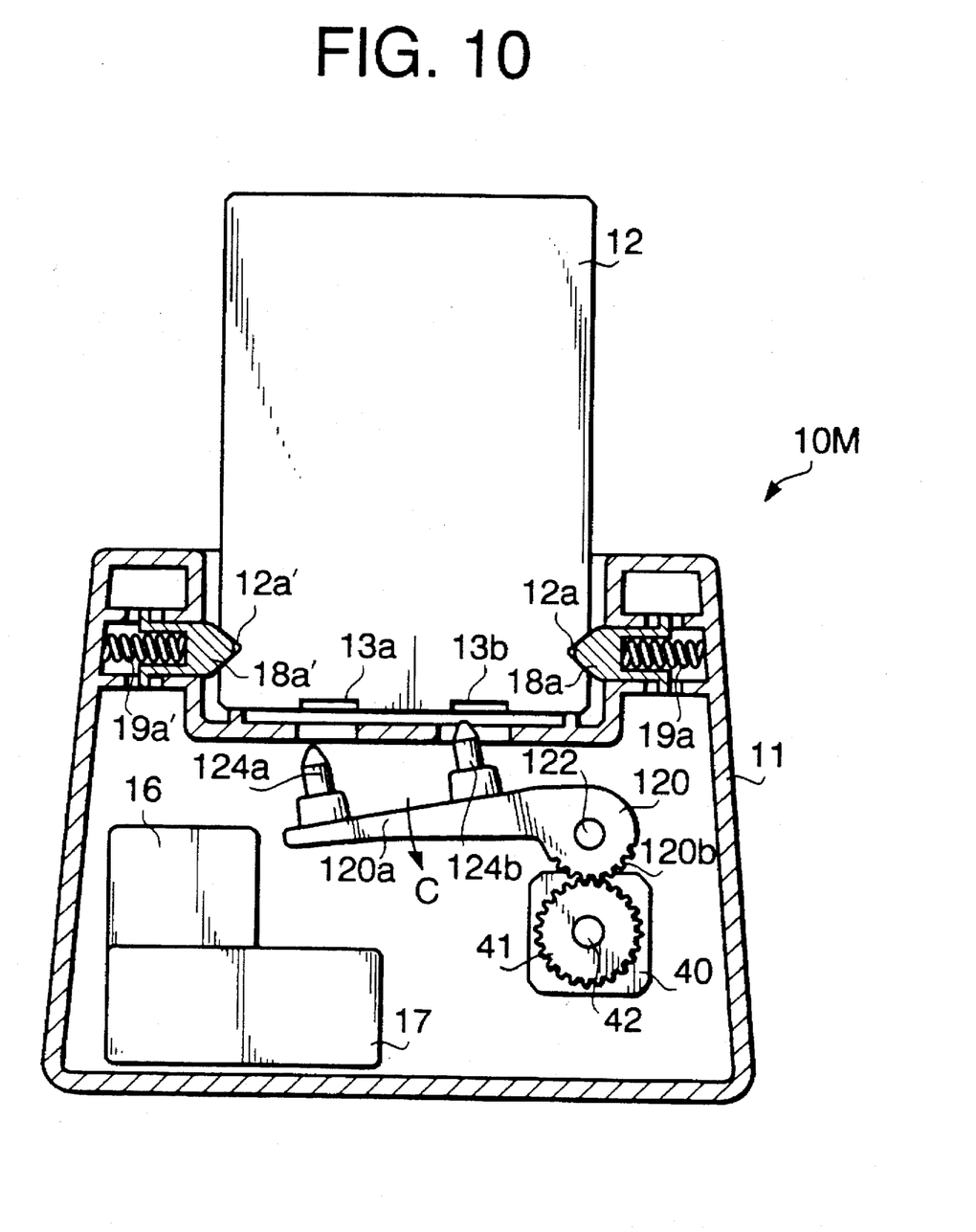
FIG. 10 is a cross sectional view of the charging device similar to FIG. 8 except that the charging electrodes are disconnected from the battery electrodes.

Note that in FIGS. 8 and 10, members similar to those used in the first embodiment have been given the same reference numerals, and the description there of are omitted. Similar to the first embodiment, when the battery 12 is mounted on the charging device 10M, the pins 18a and 18a' engage with the stepped portions 12a and 12a' of the battery 12 to stably support the battery in the battery receptacle 14. In the second embodiment, charging electrodes 124a and 124b are provided. The charging electrodes 124a and 124b have a structure as shown in FIG. 9: each electrode has a movable member 102; a holder 101; and a compression spring 103. The holder 101 slidably holds the movable member 102 which is biased upwardly. When the battery 12 is mounted on the casing 11 of the charging device 10M, the movable member 102 of each one of the charging electrodes 124a and 124b are pushed by the electrodes 13a and 13b provided on the bottom surface of the battery 12 as shown in FIG. 8.

In the second embodiment, the charging electrodes 124a and 124b are mounted on a mounting portion 120a of an arm member 120. The arm member 120 is rotatably supported by a shaft 122, and has a gear portion 120b. The gear portion 120b engages with a gear 41 which is secured to a shaft 42 of a motor 40. The arm member 120 rotates in accordance with the engagement of the gear portion 120b with the gear 40 as the motor 40 is driven to rotate.

Constructed as above, when the battery 12 is mounted on the charging device 10M, the movable member 102 is retracted by a certain amount against the biasing force of the spring 103. In this condition, the movable member 102 of each one of the charging electrodes 124a and 124b press contacts the electrodes 13a and 13b. In this case, although the electrodes 124a and 124b are pushed by the electrodes 13a and 13b of the battery 12, the arm member 120, on which the electrodes 124a and 124b are mounted, does not move since only the movable member 102 of each electrodes 124a (124b) is retracted.

After the charging is completed, the motor 40 is driven such that the arm member 120 rotates in the counterclockwise direction indicated by arrow C. Then, the charging electrodes 124a and 124b are disconnected from the battery electrodes 13a and 13b, respectively. Since the charging electrodes 124a and 124b do not contact the battery electrodes 13a and 13b after the charging is finished, the problems, i.e., discharging and corrosion problems described before are resolved. In the second embodiment, after the charging is completed, the arm member 120 is positioned as shown in FIG. 10. Accordingly, when charging of another battery is executed, the motor 40 is controlled such that the arm member 120 moves clockwisely and to be positioned as shown in FIG. 8.

According to the embodiments, firstly whether the charging of the battery is completed is determined. Then, if the charging is finished, the charging electrodes and the battery electrodes are disconnected. Therefore, the battery is not discharged through the electrodes, and the corrosion of the electrodes can also be prevented.

The present disclosure relates to subject matter contained in Japanese Patent Application No. HEI 7-224963, filed on Sep. 1, 1995, which is expressly incorporated herein by reference in its entirety.

What is claimed is:

1. A charging device for charging a secondary battery, said charging device having a plurality of charging electrodes for supplying electrical current, said secondary battery having a plurality of battery electrodes through which said electrical current is supplied from said plurality of charging electrodes, said device comprising:
    a charging completion detector for detecting whether charging of said secondary battery is completed;
    a mechanism for insulating connection between said plurality of charging electrodes with said plurality of battery electrodes when said charging completion detector detects that the charging of said secondary battery is completed.

2. The charging device according to claim 1, wherein said mechanism disconnects said plurality of charging electrodes with said plurality of battery electrodes by relatively moving said plurality of charging electrodes away from said plurality of battery electrodes.

3. The charging device according to claim 2, wherein said charging electrodes can be positioned at a first position where said charging electrodes contact said plurality of battery electrodes respectively, and a second position where said charging electrodes do not contact said plurality of battery electrodes, and wherein said mechanism positions said charging electrodes at said first position or said second position in accordance with the detection result of said charging completion detector.

4. The charging device according to claim 3, wherein said mechanism comprises an arm member on which said plurality of charging electrodes are mounted, and a driving mechanism for driving said arm member.

5. The charging device according to claim 4, wherein said arm member is rotatably supported about an axis, a gear portion be formed on said arm member abut said axis, wherein said mechanism comprises a gear member connected to a motor, said gear member being engaged with said gear portion formed on said arm member, and wherein said arm member is moved between said first and second positions as said motor rotates said gear member.

6. The charging device according to claim 2, wherein said mechanism comprises a biasing member for biasing said plurality of charging electrodes in a direction where said plurality of charging electrodes contact said plurality of battery electrodes, respectively, and an actuator for moving said plurality of charging electrodes away from said plurality of battery electrodes against a biasing force of said biasing member.

7. The charging device according to claim 6, wherein said actuator comprises a solenoid having a coil and a movable member, said movable member being moved when said coil is energized, and wherein said movable member is capable of moving said plurality of charging electrodes.

8. The charging device according to claim 1, wherein said detector comprises a voltage detector for detecting a voltage of said secondary battery, and wherein said detector determines that the charging of said secondary battery is completed when said voltage of said secondary battery becomes within a predetermined voltage range.

9. A charging device for charging a secondary battery, said charging device having a plurality of charging electrodes for supplying electrical current, said secondary battery having a plurality of battery electrodes through which said electrical current is supplied from said plurality of charging electrodes, said device comprising:

a first mechanism for allowing said plurality of charging electrodes to contact said plurality of battery electrodes, said first mechanism being neutrally effected;

a second mechanism for insulating said plurality of charging electrodes from said plurality of battery electrodes; and a controller for activating said second mechanism when charging of said second battery is not being executed.

10. The charging device according to claim 9, wherein said controller activates said second mechanism only when said charging is once started and then terminated.

11. The charging device according to claim 9, further comprising a detector for detecting whether charging of said secondary battery is completed while said charging is executed, and wherein said controller activates said second mechanism if said detector detects that said charging of said secondary battery is completed.

12. The charging device according to claim 11, further comprising a current source, controlled by said controller, for supplying electrical current to said plurality of charging electrodes, and wherein said controller controls said current source to supply said electrical current when said charging is executed, and to stop supplying said electrical current when said detector detects that said charging is completed.

13. The charging device according to claim 9, further comprising a battery receiving portion on which said secondary battery is mounted, said plurality of battery electrodes being provided on a surface facing said battery receiving portion, said plurality of charging electrodes being arranged at said battery receiving portion on a battery receiving surface facing said secondary battery.

14. The charging device according to claim 13, wherein said battery receiving surface being provided with a plurality of openings through which said plurality of charging electrodes protrude, respectively, and wherein said first mechanism comprises an electrodes supporting member on which said plurality of charging electrodes are planted, said electrodes supporting member being movable between at least first position where said plurality of charging electrodes are press-contacted with said plurality of battery electrodes, respectively, and a second position where said plurality of charging electrodes are retracted from said battery receiving surface and do not contact said plurality of battery electrodes.

15. The charging device according to claim 14, wherein said first mechanism further comprises a biasing member for biasing said electrodes supporting member to be positioned at said first position.

16. The charging device according to claim 15, wherein said second mechanism further comprises an actuator for moving said electrodes supporting member to be positioned at said second position against a biasing force of said biasing member.

* * * * *

UNITED STATES PATENT AND TRADEMARK OFFICE
CERTIFICATE OF CORRECTION

PATENT NO. : 5,686,810
DATED       : November 11, 1997
INVENTOR(S) : Tsuneo Yasui It is certified that error appears in the above-identified patent and that said Letters Patent is hereby corrected as shown below:

On title page,
    After Item [22]  Filed:  Aug. 28, 1996 delete the following: [(Under 37 CFR 1.47)]

Signed and Sealed this

Twenty-fourth Day of February, 1998

Attest:

BRUCE LEHMAN

Attesting Officer

Commissioner of Patents and Trademarks